(12) United States Patent
Han et al.

(10) Patent No.: US 9,391,527 B2
(45) Date of Patent: Jul. 12, 2016

(54) POWER SUPPLY APPARATUS

(71) Applicant: SAMSUNG ELECTRO-MECHANICS CO., LTD., Suwon, Gyunggi-do (KR)

(72) Inventors: Dae Hoon Han, Gyunggi-do (KR); Seo Hyung Kim, Gyunggi-do (KR); Joon Youp Sung, Gyunggi-do (KR); Jung Eui Park, Gyunggi-do (KR); Jung Sun Kwon, Gyunggi-do (KR); Jae Shin Lee, Gyunggi-do (KR)

(73) Assignee: SAMSUNG ELECTRO-MECHANICS CO., LTD., Suwon, Gyunggi-do (KR)

( * ) Notice: Subject to any disclaimer, the term of this patent is extended or adjusted under 35 U.S.C. 154(b) by 286 days.

(21) Appl. No.: 13/895,234

(22) Filed: May 15, 2013

(65) Prior Publication Data

US 2014/0160807 A1    Jun. 12, 2014

(30) Foreign Application Priority Data

Dec. 10, 2012  (KR) .......................... 10-2012-0142920

(51) Int. Cl.
| | |
|---|---|
| *H02M 7/5387* | (2007.01) |
| *H02M 3/335* | (2006.01) |
| *H05B 33/08* | (2006.01) |
| *H02M 1/00* | (2006.01) |

(52) U.S. Cl.
CPC ....... *H02M 3/33523* (2013.01); *H05B 33/0809* (2013.01); *H02M 2001/0058* (2013.01); *Y02B 70/1491* (2013.01)

(58) Field of Classification Search
CPC ..................... H02M 3/335; H02M 2007/4815; H02M 3/3353; H02M 3/33507; H02M 3/33523; H02M 7/5387; H02M 7/53871

USPC .......................... 363/15–17, 21.07, 21.15, 97
See application file for complete search history.

(56) References Cited

U.S. PATENT DOCUMENTS

| | | | |
|---|---|---|---|
| 4,631,652 A * | 12/1986 | Wendt ............................ | 363/16 |
| 2011/0260631 A1* | 10/2011 | Park et al. ..................... | 315/165 |
| 2012/0007512 A1 | 1/2012 | Kim et al. | |
| 2012/0146530 A1 | 6/2012 | Han et al. | |

FOREIGN PATENT DOCUMENTS

| | | |
|---|---|---|
| KR | 10-2004-0071507 A | 8/2004 |
| KR | 2012-0006392 A | 1/2012 |
| KR | 2012-0065655 A | 6/2012 |

OTHER PUBLICATIONS

Notice of Office Action Korean Patent Application No. 10-2012-0142920 dated Jan. 25, 2014 with English translation.

* cited by examiner

*Primary Examiner* — Gary L Laxton
(74) *Attorney, Agent, or Firm* — McDermott Will & Emery LLP

(57) ABSTRACT

There is provided a power supply apparatus capable of precisely control a primary side switching frequency at a secondary side by receiving fed-back information regarding a power state at the secondary side without a separate expensive circuit or a complicated circuit. The power supply apparatus includes: a power supplying unit having a primary side and a secondary side having different ground electrical characteristics, switching power input to the primary side, and transferring the switched power to the second side electrically insulated from the primary side to supply the power; a controlling unit provided on the secondary side and receiving fed-back information regarding a power state of the power supplying unit to control a maximum value and a minimum value of a switching frequency of the primary side; and a transferring unit transferring a control signal from the controlling unit to the primary side of the power supplying unit.

15 Claims, 7 Drawing Sheets

POWER SUPPLY APPARATUS

CROSS-REFERENCE TO RELATED APPLICATIONS

This application claims the priority of Korean Patent Application No. 10-2012-0142920 filed on Dec. 10, 2012, in the Korean Intellectual Property Office, the disclosure of which is incorporated herein by reference.

BACKGROUND OF THE INVENTION

1. Field of the Invention

The present invention relates to a power supply apparatus, and more particularly, to a power supply apparatus having a multi-output supplying power to a light emitting diode.

2. Description of the Related Art

Recently, in the area of displays, a display apparatus using a cathode ray tube (CRT) has been replaced with a flat panel display (FPD) reflecting user demands for features such as a high resolution, large screens, and the like.

Particularly, in the case of a large display apparatus, a liquid crystal display (LCD) has rapidly grown due to an advantage thereof in view of lightness and slimness and such an LED is expected to play a leading role in view of cost and marketability.

Meanwhile, in an existing liquid crystal display apparatus, a cold cathode fluorescent lamp (CCFL) has mainly been used as a backlight light source. However, recently, a light emitting diode (LED) has been gradually used as the backlight light source due to various advantages such as low power consumption, a long lifespan, environmentally-friendly features, and the like.

In order to drive a light emitting diode, a power supplying circuit converting commercial alternating current (AC) power into direct current (DC) power and a driving circuit controlling the supplying of the DC power to the light emitting diode are generally used.

The power supplying circuit may be divided into a primary side and a secondary side based on a transformer, in order to enhance an insulation function, wherein the primary side is configured of a circuit rectifying and smoothing the commercial AC power to switch the power and the secondary side is configured of a circuit rectifying power of which a voltage is transformed by the transformer and supplying the rectified power to a load.

That is, as disclosed in the following Related Art Document, generally, a power switching control circuit is formed on the primary side and the above-mentioned driving circuit is formed on the secondary side. In this configuration, in order to smoothly control switching of the power, information regarding a state of the power supplied to the light emitting diode should be fed back and the switching of the power should be controlled based on the information. To this end, a photo coupler having an insulation function to transfer a feedback current is mainly used. However, since the photo coupler is an optical device, signal transfer characteristics depend on photons, a use period, and a junction temperature, such that a circuit design may be complex and a manufacturing cost may be increased, due to the use of the photo coupler.

In order to solve these problems, the power switching control circuit and the driving circuit may be formed on the secondary side. However, in the case of using a scheme of receiving fed-back information regarding a power state on the secondary side to control the switching on the secondary side, it may be difficult to precisely control a switching frequency. Further, in this configuration, since a non-linear device such as a transistor for receiving and directly using the fed-back information on the power state on the secondary side should be additionally used, a manufacturing cost may be further increased.

RELATED ART DOCUMENT (Patent Document 1) Korean Patent Laid-Open Publication No. 10-2012-0006392

SUMMARY OF THE INVENTION

An aspect of the present invention provides a power supply apparatus capable of precisely controlling a primary side switching frequency at a secondary side by receiving fed-back information regarding a power state at the secondary side, without using a separate expensive device or a complicated circuit.

According to an aspect of the present invention, there is provided a power supply apparatus including: a power supplying unit having a primary side and a secondary side having different ground electrical characteristics, switching an input power input to the primary side, and transferring the switched power to the second side electrically insulated from the primary side to supply the power; a controlling unit provided on the secondary side and receiving fed-back information regarding a power state of the power supplying unit to control a maximum value and a minimum value of a switching frequency of the primary side; and a transferring unit transferring a control signal from the controlling unit provided on the secondary side to the primary side of the power supplying unit.

The power supplying unit may include: a switching unit including at least two switches connected to each other in series between an input power terminal to which the input power is input and a ground and switching the input power; a transforming unit transforming a voltage level of the power switched by the switching unit; a first outputting unit stabilizing the power output from the transforming unit to output a first preset power; and a second outputting unit stabilizing the power output from the transforming unit to output a second preset power.

The transforming unit may include: a resonance tank providing resonance required in an inductor-inductor-capacitor (LLC) resonance operation of the switching unit; and a transformer having a primary winding receiving the switched power of the switching unit and first and second secondary windings forming respective preset turn ratios with the primary winding to output the first power and the second power, respectively.

The power supplying unit may further include: a rectifying-smoothing unit rectifying and smoothing alternating current (AC) power to generate direct current (DC) power; and a power factor correcting unit correcting a power factor of the DC power from the rectifying-smoothing unit and supplying the DC power of which the power factor is corrected to the switching unit.

The controlling unit may include: a current generating unit generating a maximum current and a minimum current flowing in external resistors, respectively; a signal generating unit generating a pulse signal having a frequency determined according to the currents generated by the current generating unit; a monostable unit determining a timing of a signal according to the pulse signal of the signal generating unit; and a driving unit generating a switching signal controlling the switching of the switching unit according to the timing of the monostable unit.

The signal generating unit may include: a capacitor charged with the current from the current generating unit or discharging the current; a switch controlling the charging or discharging of the capacitor; a first comparator comparing a first preset reference voltage with a voltage of the capacitor to control the switching of the switch; a second comparator comparing the voltage of the capacitor with a second preset reference voltage to supply the pulse signal to the monostable unit; and a buffer buffering a switching control signal of the first comparator.

The current generating unit may include: a first comparator comparing a preset reference voltage with the currents flowing in the external resistors to control the switching of the switch; a current mirror mirroring the currents flowing in the external resistors and transferring the mirrored currents to the signal generating unit; a second comparator comparing a target power level with a fed-back power level; a compensator compensating for a power difference of the second comparator; and a buffer buffering the comparison result of the second comparator.

The current generating unit may further include a voltage divider dividing the comparison result of the second comparator and transferring the divided result to the buffer.

The first power may be supplied to at least one light emitting diode channel.

The controlling unit may control the switching frequency according to the power state of the power supplying unit to control a power state of the first power and controls a switching duty to control a power state of the second power.

According to another aspect of the present invention, there is provided a power supply apparatus including: a power supplying unit having a primary side and a secondary side having different ground electrical characteristics, switching an input power input to the primary side, and transferring the switched power to the second side electrically insulated from the primary side to supply the power to at least one light emitting diode channel; a controlling unit provided on the secondary side, receiving fed-back information regarding a power state of the power supplying unit, and controlling a maximum value and a minimum value of a switching frequency of the primary side according to a minimum current flowing in a first external resistor and a maximum current flowing in a second external resistor; and a transferring unit transferring a control signal from the controlling unit provided on the secondary side to the primary side of the power supplying unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
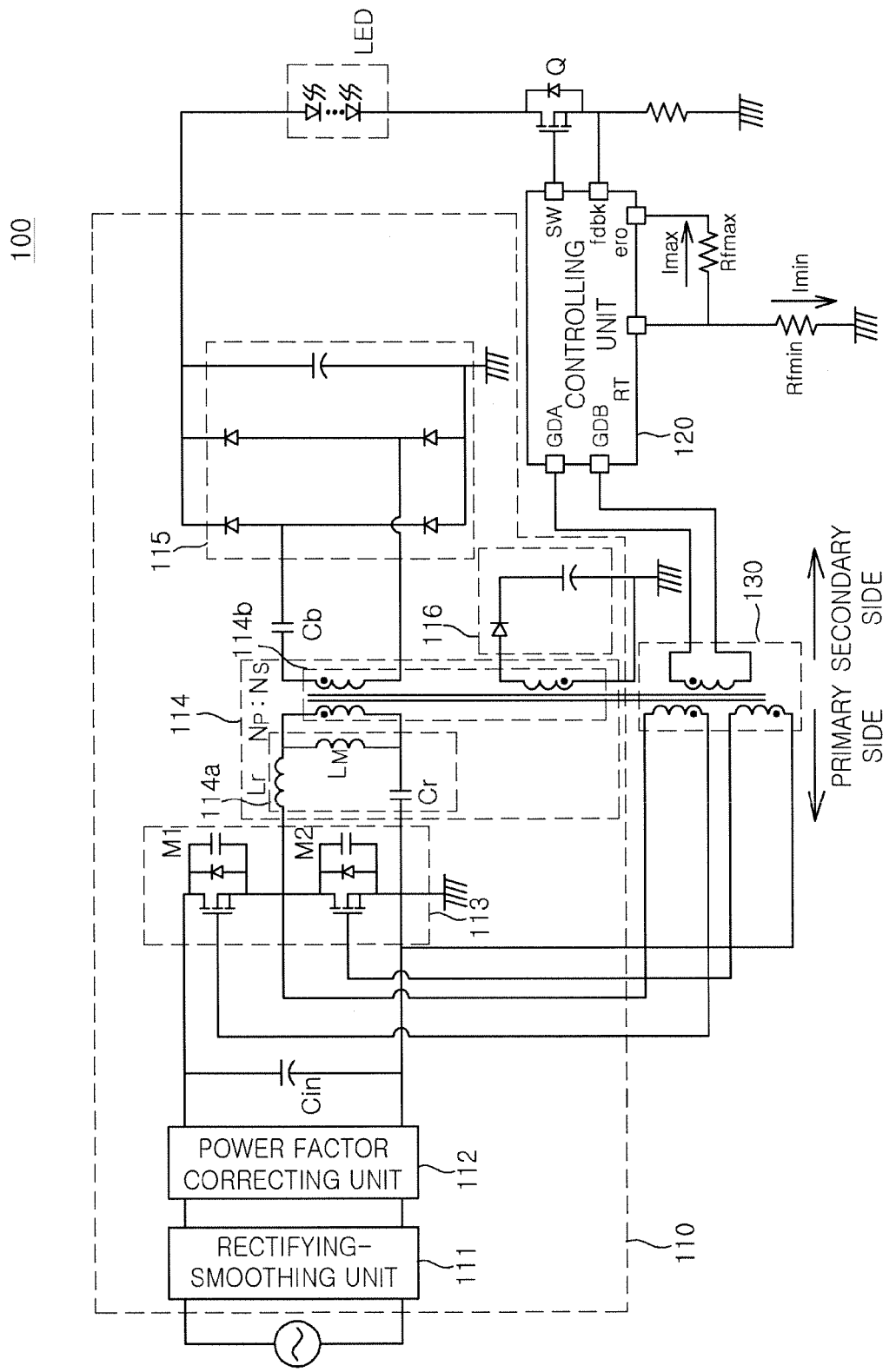
FIG. 1 is a circuit diagram schematically showing a power supply apparatus according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the same or like reference numerals will be used to designate the same or like elements.

FIG. 1 is a circuit diagram schematically showing a power supply apparatus according to an embodiment of the present invention.

Referring to FIG. 1, the power supply apparatus 100 according to the embodiment of the present invention may include a power supplying unit 110, a controlling unit 120, and a transferring unit 130.

The power supplying unit 110 may include a switching unit 113, a transforming unit 114, and a first outputting unit 115, and further include a rectifying-smoothing unit 111, a power factor correcting unit 112, and a second outputting unit 116.

The rectifying-smoothing unit 111 may rectify and smooth alternating current (AC) power to generate direct current (DC) power and transfer the DC power to the power factor correcting unit 112, and the power factor correcting unit 112 may adjust a phase difference between a voltage and a current of the DC power from the rectifying-smoothing unit 111 to correct a power factor.

The switching unit 113 may include at least two switches M1 and M2 stacked between an input power terminal to which the DC power from the power factor correcting unit 112 is input and a ground and perform a power conversion operation by an alternate switching operation of the first and second switches M1 and M2.

The transforming unit 114 may include a resonance tank 114*a* and a transformer 114*b*, wherein the resonance tank 114*a* may provide resonance required in an inductor-inductor-capacitor (Lr-Lm-Cr) (LLC) resonance operation. Here, one (Lm) of the inductors may be a magnetizing inductor of the transformer 114*b*.

The transformer 114*b* may include a primary winding P and secondary windings S1 and S2, wherein the primary winding P and the secondary windings S1 and S2 may be electrically insulated from each other. That is, the primary winding P may be positioned on a primary side and the secondary windings S1 and S2 may be positioned on a secondary side, the primary side and the secondary side having different ground electrical characteristics.

More specifically, the rectifying-smoothing unit 111, the power factor correcting unit 112, the switching unit 113, the resonance tank 114*a*, and the primary winding P of the transformer 114*b* may be formed on the primary side, the secondary windings S2 and S2 of the transformer 114*b*, the first and second outputting units 115 and 116, and the controlling unit 120 may be formed on the secondary side, and the transferring unit 130 may be formed between the primary side and the secondary side.

The primary winding P and the secondary windings S1 and S2 may form a preset turn ratio, and the secondary windings S1 and S2 may vary a voltage level according to the turn ratio and output power having the varied voltage level.

The first outputting unit 115 may rectify, stabilize, and output first power from a first secondary winding S1 and supply the first power to at least one light emitting diode channel.

The second outputting unit 116 may rectify, stabilize, and output second power from a second secondary winding S2.

The controlling unit 120 may be formed on the secondary side and receive fed-back information regarding a power state of the first outputting unit 115 to thereby control a switching frequency of the switching unit 113 positioned on the primary side. More specifically, the first power of the first outputting unit 115 may be supplied to at least one light emitting diode channel LED to control switching of a driving switch Q between a last terminal of the light emitting diode channel LED and a ground, thereby adjusting brightness of the light emitting diode channel LED, and a power level of the first power may be controlled by controlling the switching frequency of the switching unit 113 according to a feedback signal fdbk indicating a detection result of a current flowing in the light emitting diode channel LED.

In this configuration, the controlling unit 120 may provide switching control signals GDA and GDB for controlling a minimum value and a maximum value of the switching frequency of the switching unit 113 based on currents flowing in first and second external resistors Rfmin and Rfmax, and the transferring unit 130 may be configured of an insulation transformer to transfer the switching control signals GDA and GDB of the secondary side to the corresponding switches of the switching unit 113 of the primary side.

Meanwhile, the controlling unit 120 may control the switching frequency of the switching unit 113 to control a power level of the first power and control a switching duty of the switching unit 113 to control a power level of the second power.

Since a technology of controlling the power level of the first power by the switching frequency and controlling the power level of the second power by the switching duty using a single control circuit and a single switching circuit at the time of a multi-output in the power supply apparatus is well-known in the art, a detailed description thereof will be omitted.

Figure 2:
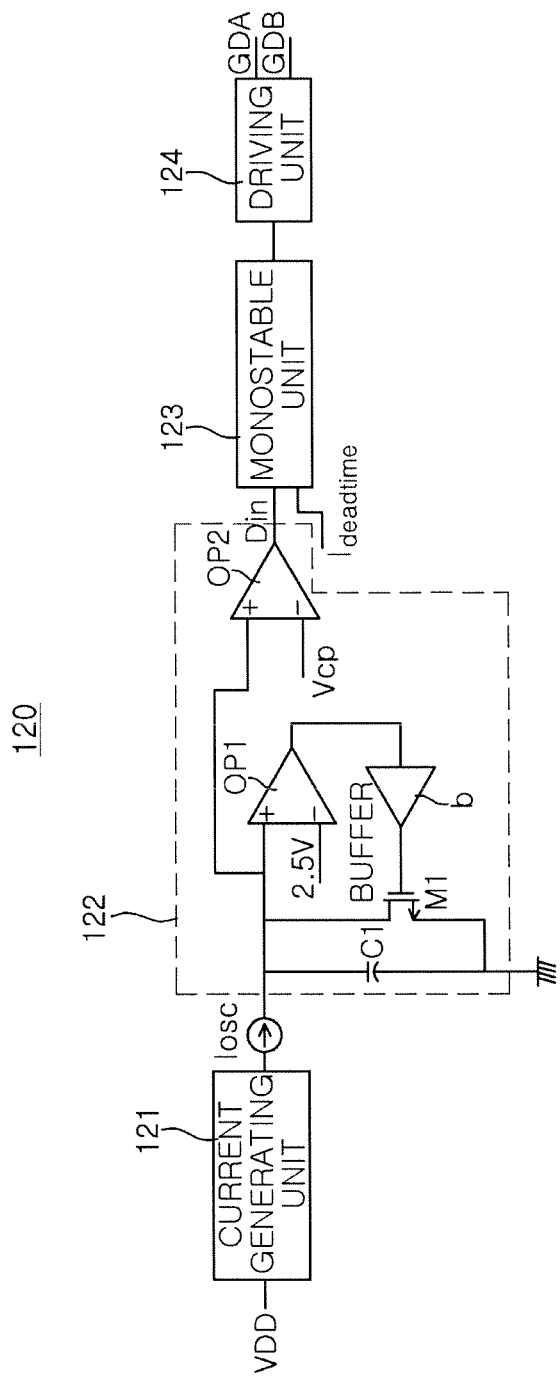
FIG. 2 is a circuit diagram schematically showing a controlling unit used in the power supply apparatus according to the embodiment of the present invention.
Figure 4:
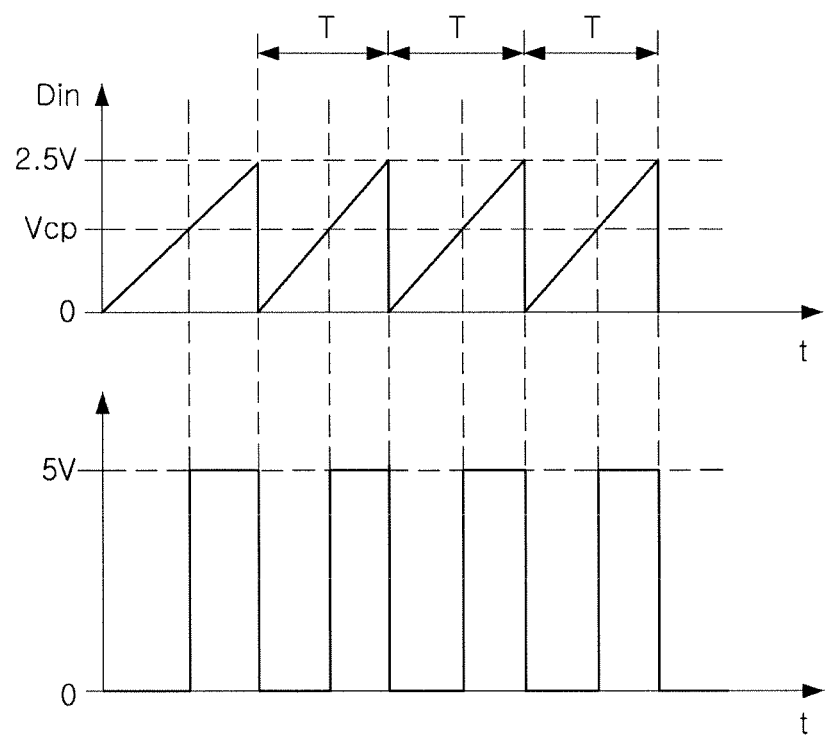
FIG. 4 is a graph showing signal waveforms of main components of the controlling unit used in the power supply apparatus according to the embodiment of the present invention.

FIG. 2 is a circuit diagram schematically showing a controlling unit used in the power supply apparatus according to the embodiment of the present invention; and FIG. 4 is a graph showing signal waveforms of main components of the controlling unit used in the power supply apparatus according to the embodiment of the present invention.

Referring to FIG. 2, the controlling unit 120 may include a current generating unit 121, a signal generating unit 122, a monostable unit 123, and a driving unit 124.

The current generating unit 121 may receive power VDD to generate currents flowing in the first and second external resistors Rfmin and Rfmax and transfer the generated currents to the signal generating unit 122. The signal generating unit 122 may include a capacitor C1, a switch Q1, a first comparator op1, a second comparator op2, and a buffer b, generate a sawtooth signal according to a current charged in or discharged from the capacitor C1, and transfer a pulse signal according to the sawtooth signal to the monostable unit 123.

More specifically, the capacitor C1 may be charged with the current from the current generating unit 121 or discharge the current according to a switching operation of the switch Q1, and the first comparator op1 may compare a first preset reference voltage (for example, 2.5V) with a level of a voltage charged in the capacitor C1 and control the switching of the switch Q1 according to the comparison result. The buffer b may buffer the comparison result signal of the first comparator op1 and transfer the buffered signal to the switch Q1.

Therefore, the level of the voltage of the capacitor c1 may have a form such as a sawtooth signal as shown in FIG. 4, and the second comparator op2 may compare the sawtooth signal with a second preset reference voltage Vcp and provide a pulse signal Din to the monostable unit 123.

The monostable unit 123 may receive the pulse signal Din and a preset dead time $I_{deadtime}$ and transfer a pulse signal having a dead time to the driving unit 124, and the driving unit 124 may provide the switching control signals GDA and GDB capable of driving the switches M1 and M2 of the switching unit 113 based on the pulse signal from the monostable unit 123.

Meanwhile, a level of a current $I_{OSC}$ from the current generating unit 121 may control a time in which the current is charged in the capacitor C1. Therefore, frequencies of the switching control signals GDA and GDB may be controlled.

Figure 3:
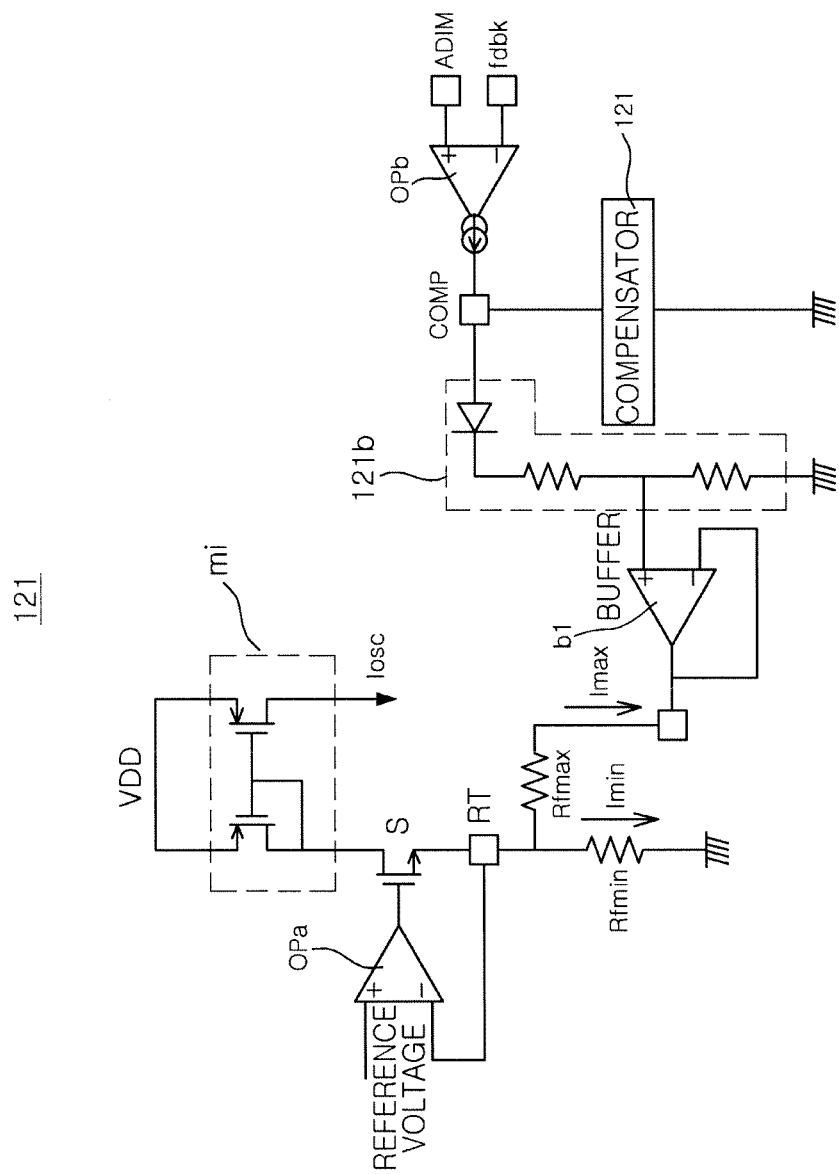
FIG. 3 is a circuit diagram schematically showing a current generating unit of the controlling unit used in the power supply apparatus according to the embodiment of the present invention.
Figure 5:
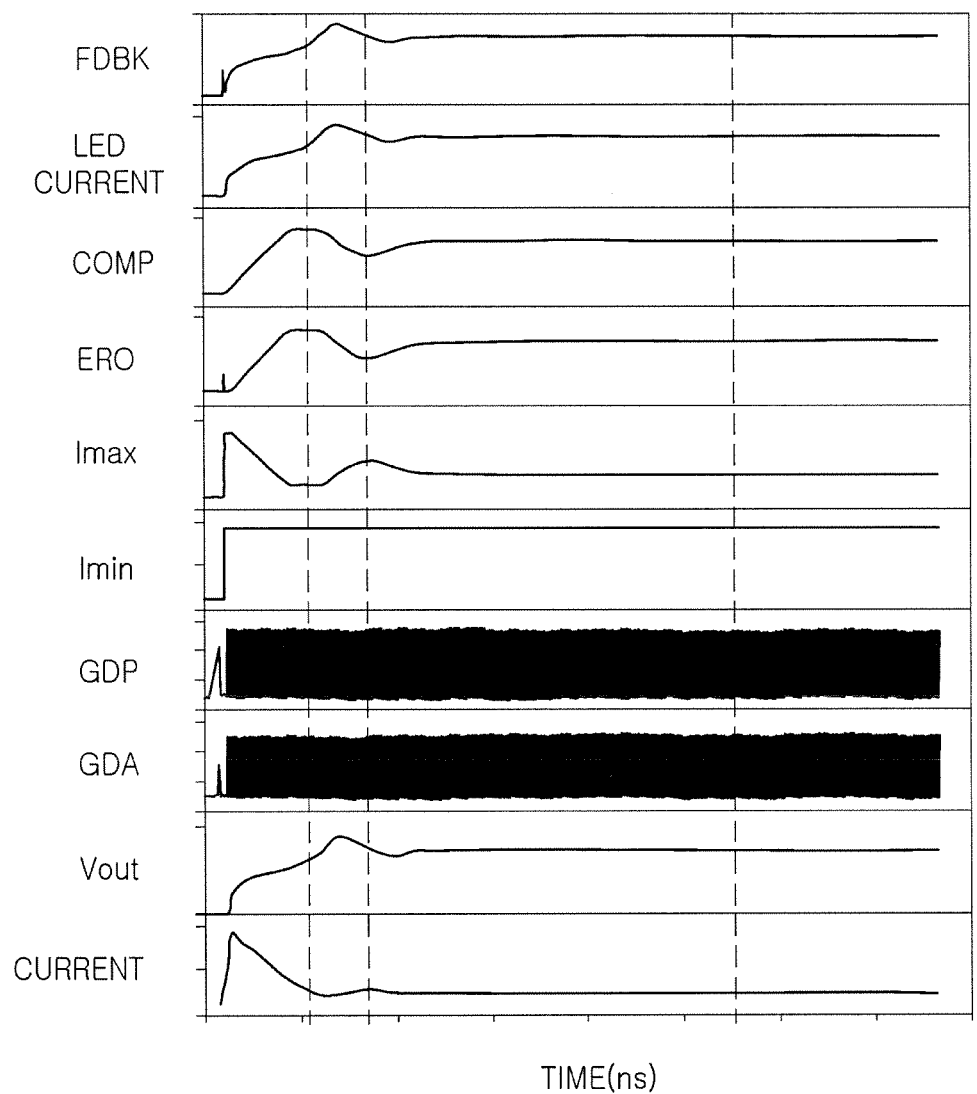
FIG. 5 is a graph showing signal waveforms of main components of the power supply apparatus according to the embodiment of the present invention.

FIG. 3 is a circuit diagram schematically showing the current generating unit of the controlling unit used in the power supply apparatus according to the embodiment of the present invention; and FIG. 5 is a graph showing signal waveforms of main components of the power supply apparatus according to the embodiment of the present invention.

Referring to FIG. 3, the current generating unit 121 may include a current mirror mi, a first comparator opa, a switch S, a second comparator opb, and a compensator 121*a*, and further include a voltage divider 121*b*.

The current mirror mi may mirror the currents flowing in the first and second resistors Rfmin and Rfmax and supply the mirrored currents to the signal generating unit 122.

The first comparator opa may compare a preset reference voltage with the currents flowing in the first and second resistors Rfmin and Rfmax and control the switching operation of the switch S according to the comparison result to thereby control the currents flowing in the first and second resistors Rfmin and Rfmax.

The second comparator opb may compare a target power level ADIM with a feedback signal fdbk indicating a detection result of the current (LED current) flowing in the light emitting diode channel LED and output the comparison result, and the compensator 121*a* may compensate for a power difference of the comparison result. The buffer b1 may buffer the comparison result signal from the second comparator opb to control the current flowing in the second resistor Rfmax. The voltage divider 121*b* may divide a voltage level of the comparison result signal and transfer the divided voltage level to the buffer b1.

More specifically, as shown in FIG. 5, when a level of the feedback signal fdbk is lower than the target power level ADIM, a comparison result signal level comp of the second comparator opb increases, such that a voltage level ero at an output terminal of the buffer b1 may increase. Since current Imin flowing in the first resistor Rfmin is fixed, current Imax flowing in the second resistor Rfmax gradually decreases, such that the frequencies of the switching control signals GDA and GDB may become slow and a voltage level Vout of the first power may increase (Section 1).

To the contrary, when a level of the feedback signal fdbk is higher than the target power level ADIM, the comparison result signal level comp decreases, such that the voltage level ero at the output terminal of the buffer b1 may decrease. Therefore, the current Imax flowing in the second resistor Rfmax gradually increases, such that the frequencies of the switching control signals GDA and GDB may become fast and the voltage level Vout of the first power may decrease (Section 2). The above-mentioned operations are repeated, such that a target output voltage of the first power may be regulated (Section 3).

Meanwhile, in the power supply apparatus according to the embodiment of the present invention shown in FIG. 1, a scheme of controlling the current flowing in the light emitting diode channel LED is used. As a scheme similar to the above-mentioned scheme, there may be a scheme of controlling a voltage input to the light emitting diode channel LED.

Figure 6:
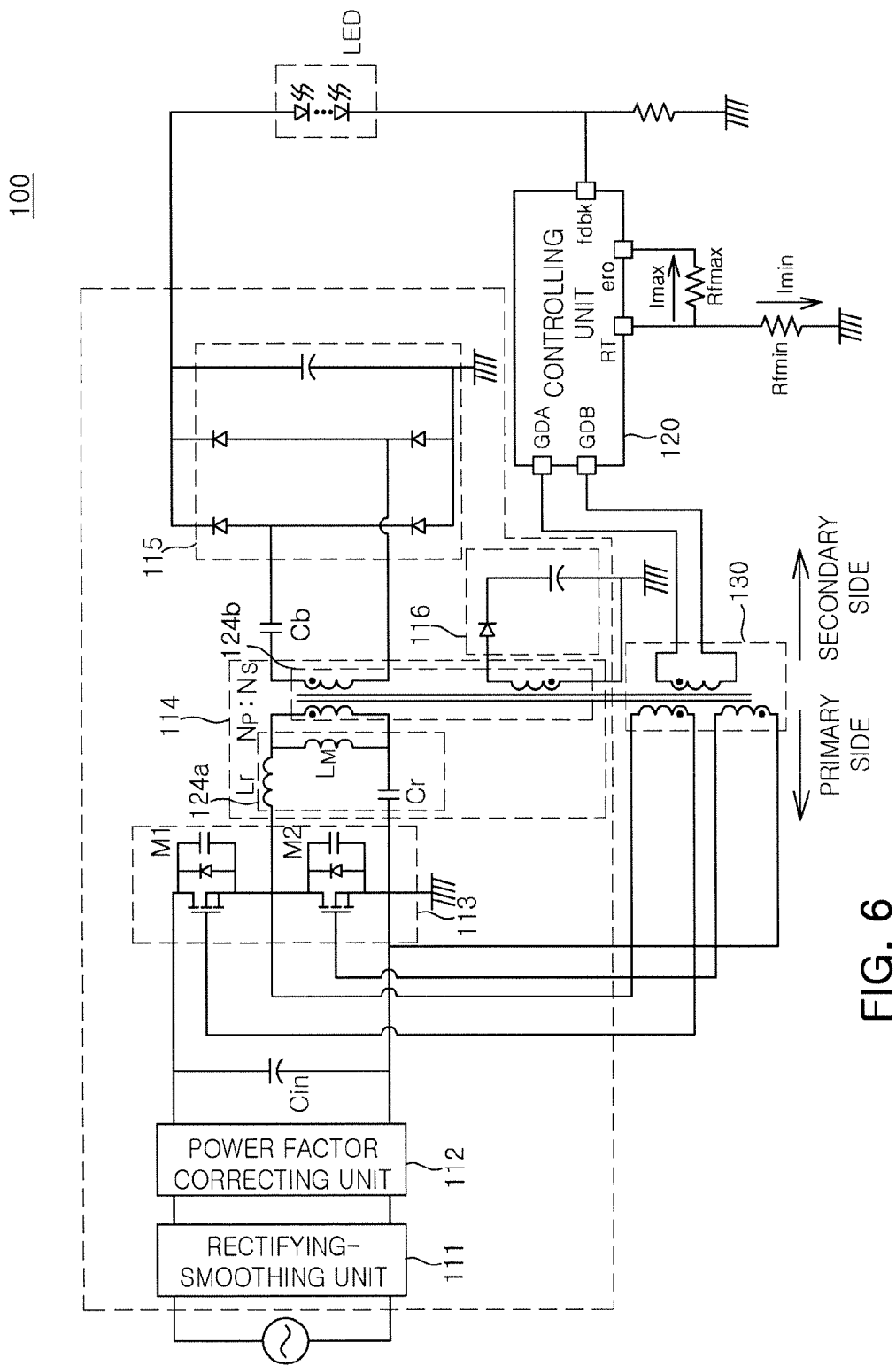
FIG. 6 is a circuit diagram schematically showing a power supply apparatus according to another embodiment of the present invention.
Figure 7:
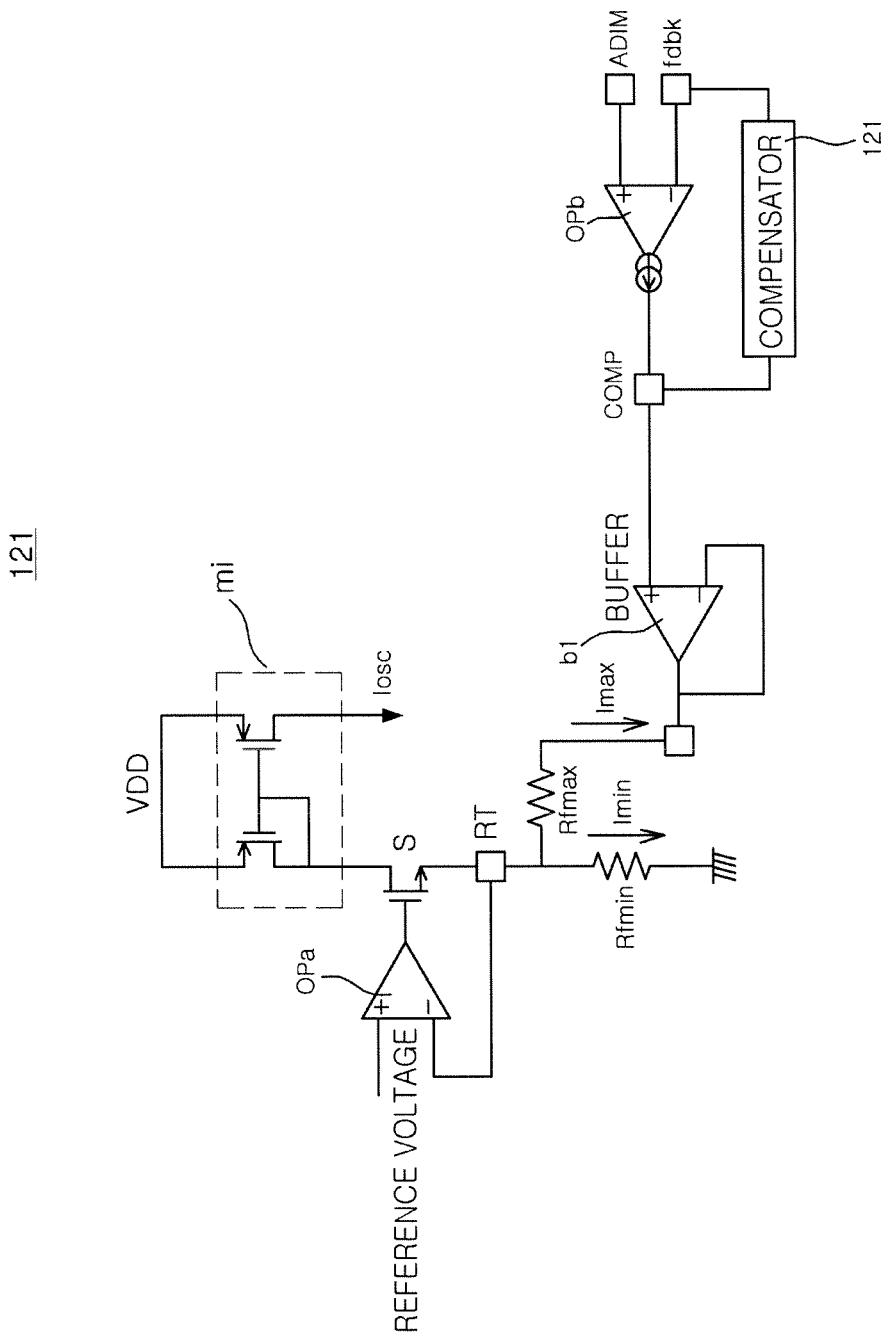
FIG. 7 is a circuit diagram schematically showing a current generating unit of a controlling unit of the power supply apparatus according to another embodiment of the present invention.

FIG. 6 is a circuit diagram schematically showing a power supply apparatus according to another embodiment of the present invention; and FIG. 7 is a circuit diagram schematically showing a current generating unit of a controlling unit of the power supply apparatus according to another embodiment of the present invention.

The power supply apparatus according to another embodiment of the present invention shown in FIG. 6 may be similar to the power supply apparatus according to the embodiment of the present invention shown in FIG. 1, and may include the same components as those of the power supply apparatus according to the embodiment of the present invention shown in FIG. 1, except for the driving switch Q of FIG. 1 formed between the last terminal of the light emitting diode channel LED and the ground. Therefore, a detailed description of the same components will be omitted.

As described above, the power supply apparatus according to another embodiment of the present invention shown in FIG. 6 may receive fed-back information regarding the current flowing in the light emitting diode channel LED to control the voltage of the first power applied to the light emitting diode channel LED. To this end, in the current generating unit 121 of the controlling unit, the compensator 121a may compensate for a power difference between the feedback signal fdbk and the comparison result of the second comparator opb and the voltage divider 121b may be omitted, unlike the case shown in FIG. 3.

As set forth above, according to embodiments of the present invention, the primary side switching frequency is controlled at the secondary side by controlling the current flowing in the resistor only using the external resistors without using a separate expensive device or a complicated circuit, whereby a circuit may be simplified and a manufacturing cost thereof may be reduced.

While the present invention has been shown and described in connection with the embodiments, it will be apparent to those skilled in the art that modifications and variations can be made without departing from the spirit and scope of the invention as defined by the appended claims.

What is claimed is:

1. A power supply apparatus comprising:
a power supplying unit having a primary side and a secondary side having different ground electrical characteristics, switching an input power input to the primary side, and transferring the switched power to the second side electrically insulated from the primary side to supply an output power;
a controlling unit provided on the secondary side and receiving fed-back information regarding a power state of the power supplying unit to control a maximum value and a minimum value of a switching frequency of the primary side; and
a transferring unit transferring a control signal from the controlling unit provided on the secondary side to the primary side of the power supplying unit;
wherein the controlling unit determines the switching frequency according to a generated maximum current and a generated minimum current,
wherein the controlling unit includes:
a current generating unit generating a maximum current and a minimum current flowing in external resistors, respectively;
a signal generating unit generating a pulse signal having a frequency determined according to the currents generated by the current generating unit;
a monostable unit determining a timing of a signal according to the pulse signal of the signal generating unit; and
a driving unit generating a switching signal controlling the switching of the switching unit according to the timing of the monostable unit, and
wherein the signal generating unit includes:
a capacitor charged with the current from the current generating unit or discharging the current;
a switch controlling the charging or discharging of the capacitor;
a first comparator comparing a first preset reference voltage with a voltage of the capacitor to control the switching of the switch;
a second comparator comparing the voltage of the capacitor with a second preset reference voltage to supply the pulse signal to the monostable unit; and
a buffer buffering a switching control signal of the first comparator.

2. The power supply apparatus of claim 1, wherein the power supplying unit includes:
a switching unit including at least two switches connected to each other in series between an input power terminal to which the input power is input and a ground and switching the input power;
a transforming unit transforming a voltage level of the power switched by the switching unit;
a first outputting unit stabilizing the power output from the transforming unit to output a first preset power; and
a second outputting unit stabilizing the power output from the transforming unit to output a second preset power.

3. The power supply apparatus of claim 2, wherein the transforming unit includes:
a resonance tank providing resonance required in an inductor-inductor-capacitor (LLC) resonance operation of the switching unit; and
a transformer having a primary winding receiving the switched power of the switching unit and first and second secondary windings forming respective preset turn ratios with the primary winding to output the first power and the second power, respectively.

4. The power supply apparatus of claim 2, wherein the power supplying unit further includes:
a rectifying-smoothing unit rectifying and smoothing alternating current (AC) power to generate direct current (DC) power; and
a power factor correcting unit correcting a power factor of the DC power from the rectifying-smoothing unit and supplying the DC power of which the power factor is corrected to the switching unit.

5. The power supply apparatus of claim 1, wherein the current generating unit includes:
   a first comparator comparing a preset reference voltage with the currents flowing in the external resistors to control the switching of the switch;
   a current mirror mirroring the currents flowing in the external resistors and transferring the mirrored currents to the signal generating unit;
   a second comparator comparing a target power level with a fed-back power level;
   a compensator compensating for a power difference of the second comparator; and
   a buffer buffering the comparison result of the second comparator.

6. The power supply apparatus of claim 5, wherein the current generating unit further includes a voltage divider dividing the comparison result of the second comparator and transferring the divided result to the buffer.

7. The power supply apparatus of claim 2, wherein the first power is supplied to at least one light emitting diode channel.

8. The power supply apparatus of claim 2, wherein the controlling unit controls the switching frequency according to the power state of the power supplying unit to control a power state of the first power, wherein the controlling unit controls a switching duty to control a power state of the second power.

9. A power supply apparatus comprising:
   a power supplying unit having a primary side and a secondary side having different ground electrical characteristics, switching an input power input to the primary side, and transferring the switched power to the second side electrically insulated from the primary side to supply an output power to at least one light emitting diode channel;
   a controlling unit provided on the secondary side, receiving fed-back information regarding a power state of the power supplying unit, and controlling a maximum value and a minimum value of a switching frequency of the primary side according to a minimum current flowing in a first external resistor and a maximum current flowing in a second external resistor; and
   a transferring unit transferring a control signal from the controlling unit provided on the secondary side to the primary side of the power supplying unit,
   wherein the controlling unit includes:
      a current generating unit generating the maximum current and the minimum current flowing in the first and second external resistors, respectively;
      a signal generating unit generating a pulse signal having a frequency determined according to the currents generated by the current generating unit;
      a monostable unit determining a timing of a signal according to the pulse signal of the signal generating unit; and
      a driving unit generating a switching signal controlling the switching of the switching unit according to the timing of the monostable unit, and
   wherein the signal generating unit includes:
      a capacitor charged with the current from the current generating unit or discharging the current;
      a switch controlling the charging or discharging of the capacitor;
      a first comparator comparing a first preset reference voltage with a voltage of the capacitor to control the switching of the switch;
      a second comparator comparing the voltage of the capacitor with a second preset reference voltage to supply the pulse to the monostable unit; and
      a buffer buffering a switching control signal of the first comparator.

10. The power supply apparatus of claim 9, wherein the power supplying unit includes:
    a switching unit including at least two switches connected to each other in series between an input power terminal to which the input power is input and a ground and switching the input power;
    a transforming unit transforming a voltage level of the power switched by the switching unit;
    a first outputting unit stabilizing the power output from the transforming unit to output a first preset power to the at least one light emitting diode channel; and
    a second outputting unit stabilizing the power output from the transforming unit to output a second preset power.

11. The power supply apparatus of claim 10, wherein the transforming unit includes:
    a resonance tank providing resonance required in an inductor-inductor-capacitor (LLC) resonance operation of the switching unit; and
    a transformer having a primary winding receiving the switched power of the switching unit and first and second secondary windings forming respective preset turn ratios with the primary winding to output the first power and the second power, respectively.

12. The power supply apparatus of claim 10, wherein the power supplying unit further includes:
    a rectifying-smoothing unit rectifying and smoothing AC power to generate DC power; and
    a power factor correcting unit correcting a power factor of the DC power from the rectifying-smoothing unit and supplying the DC power of which the power factor is corrected to the switching unit.

13. The power supply apparatus of claim 9, wherein the current generating unit includes:
    a first comparator comparing a preset reference voltage with the sum of the currents flowing in the first and second external resistors to control the switching of the switch;
    a current mirror mirroring the currents flowing in the first and second external resistors and transferring the mirrored currents to the signal generating unit;
    a second comparator comparing a target power level with a fed-back power level to control the maximum current flowing in the second external resistor;
    a compensator compensating for a power difference of the second comparator; and
    a buffer buffering the comparison result of the second comparator.

14. The power supply apparatus of claim 13, wherein the current generating unit further includes a voltage divider dividing the comparison result of the second comparator and transferring the divided result to the buffer.

15. The power supply apparatus of claim 10, wherein the controlling unit controls the switching frequency according to the power state of the power supplying unit to control a power state of the first power and controls a switching duty to control a power state of the second power.

* * * * *